United States Patent
Allen

(10) Patent No.: US 10,435,147 B2
(45) Date of Patent: Oct. 8, 2019

(54) MULTIROTOR AIRCRAFT CONTROL SYSTEMS

(71) Applicant: Cloud Cap Technology, Inc., Hood River, OR (US)

(72) Inventor: Michael J Allen, White Salmon, WA (US)

(73) Assignee: Cloud Cap Technology, Inc., Hood River, OR (US)

( * ) Notice: Subject to any disclaimer, the term of this patent is extended or adjusted under 35 U.S.C. 154(b) by 703 days.

(21) Appl. No.: 14/954,294

(22) Filed: Nov. 30, 2015

(65) Prior Publication Data
US 2017/0152033 A1 Jun. 1, 2017

(51) Int. Cl.
| | | |
|---|---|---|
| *B64C 27/08* | (2006.01) | |
| *B64C 27/57* | (2006.01) | |
| *B64D 31/02* | (2006.01) | |
| *G05D 1/00* | (2006.01) | |
| *G05D 1/08* | (2006.01) | |
| *B64C 39/02* | (2006.01) | |

(52) U.S. Cl.
CPC ............. *B64C 27/57* (2013.01); *B64D 31/02* (2013.01); *G05D 1/0072* (2013.01); *G05D 1/0858* (2013.01); *B64C 27/08* (2013.01); *B64C 39/024* (2013.01); *B64C 2201/027* (2013.01); *B64C 2201/108* (2013.01); *B64C 2201/14* (2013.01)

(58) Field of Classification Search
CPC ......... B64C 27/08; B64C 27/57; B64D 31/02; G05D 1/0072; G05D 1/0816
See application file for complete search history.

(56) References Cited

U.S. PATENT DOCUMENTS

| | | | |
|---|---|---|---|
| 9,146,557 B1 | 9/2015 | Ahmed et al. | |
| 9,557,742 B2* | 1/2017 | Paduano | G05D 1/042 |
| 2007/0023581 A1* | 2/2007 | La | B64C 27/20 |
| | | | 244/165 |
| 2011/0226892 A1* | 9/2011 | Crowther | B64C 27/08 |
| | | | 244/17.23 |
| 2014/0097290 A1 | 4/2014 | Leng | |

(Continued)

FOREIGN PATENT DOCUMENTS

| | | |
|---|---|---|
| CN | 104290919 A | 1/2015 |
| JP | 2014227155 A | 12/2014 |

(Continued)

OTHER PUBLICATIONS

Marks et al., "Control Allocation for Fault Tolerant Control of a VTOL Octorotor", Sep. 2012, UKACC International Conference on Control 2012, pp. 357-362, IEEE (Year: 2012).*

(Continued)

*Primary Examiner* — Richard R. Green
(74) *Attorney, Agent, or Firm* — Locke Lord LLP; Daniel J. Fiorello; Joshua L. Jones

(57) ABSTRACT

A method for controlling each rotor on a multirotor aircraft includes receiving one or more sensed states of the multirotor aircraft, and determining a control scheme dynamically using the sensed one or more states of the multirotor aircraft. Receiving one or more sensed states can include receiving one or more of a rotational rate or acceleration of the aircraft, or any other suitable aircraft state.

19 Claims, 1 Drawing Sheet

(56) References Cited

U.S. PATENT DOCUMENTS

| | | | |
|---|---|---|---|
| 2016/0023755 A1* | 1/2016 | Elshafei | G08G 5/025 |
| | | | 244/17.13 |
| 2016/0059958 A1* | 3/2016 | Kvitnevskiy | B64C 27/08 |
| | | | 701/3 |
| 2017/0023937 A1* | 1/2017 | Loianno | G05D 1/0011 |
| 2018/0134383 A1* | 5/2018 | Schulz | B64C 27/08 |

FOREIGN PATENT DOCUMENTS

| | | | | |
|---|---|---|---|---|
| WO | WO-2012035025 A2 | | 3/2012 | |
| WO | WO-2014198642 A1 | * | 12/2014 | B64C 27/08 |

OTHER PUBLICATIONS

Mühlegg, M., Niermeyer, P., & Holzapfel, F. (Nov. 2014). Reference command shaping for approximate dynamic inversion based model reference adaptive control. In Aerospace Electronics and Remote Sensing Technology (ICARES), 2014 IEEE International Conference on (pp. 179-184). IEEE. (Year: 2014).*

International Search Report and Written Opinion of the European Patent Office, as ISA, dated Mar. 1, 2017, in corresponding International Patent Application PCT/US2016/061783.

Shen Qiang et al., "Fault-Tolerant Attitude Tracking Control for a Quadrotor Aircraft", 53rd IEEE Conference on Decision and Control, IEEE Dec. 15, 2014, pp. 6129-6134, XP032734486.

Aryeh Marks et al., "Control Allocation for Fault Tolerant Control of a VTOL Octorotor", UKACC International Conference on Control (Control), 2012, IEEE, Sep. 3, 2012, pp. 357-362, XP03256358.

\* cited by examiner

MULTIROTOR AIRCRAFT CONTROL SYSTEMS

BACKGROUND

1. Field

The present disclosure relates to aircraft, more specifically to multirotor craft and control systems therefor.

2. Description of Related Art

Multi-rotor vehicles employ multiple propellers to both lift the vehicle and control attitude. This has many advantages over other vertical takeoff and landing (VTOL) vehicles including simplicity, low cost, and high bandwidth control. Unlike fixed wing and rotary wing vehicles, multirotor vehicles do not have the ability to glide or auto-rotate if power is lost to one or more propellers. If power to one or more rotors is lost a multi-rotor vehicle suffers both loss of lifting force and either degraded control or complete loss of control.

Such conventional methods and systems have generally been considered satisfactory for their intended purpose. However, there is still a need in the art for improved control systems for multirotor aircraft. The present disclosure provides a solution for this need.

SUMMARY

A method for controlling each rotor on a multirotor aircraft includes receiving one or more sensed states of the multirotor aircraft, and determining a control scheme dynamically using the sensed one or more states of the multirotor aircraft. Receiving one or more sensed states can include receiving one or more of a rotational rate or acceleration of the aircraft, or any other suitable aircraft state.

Determining the control scheme can include defining a control effect matrix that specifies the contribution of each rotor to a change of the one or more sensed states of the multirotor aircraft. In certain embodiments, determining the control scheme can include using matrix inversion on the control effect matrix (e.g., if the multirotor aircraft includes up to four rotors). Determining the control scheme can include using matrix pseudo-inversion on the control effect matrix (e.g., if the multirotor aircraft includes more than four rotors).

In certain embodiments, determining the control scheme can include detecting a rotor condition by comparing one or more expected states to the one or more sensed states to determine if the one or more sensed states are within a threshold value of the one or more expected states. Detecting the rotor condition can include detecting a failed rotor.

Determining the control scheme can include redefining the control effect matrix to remove the failed rotor from the control effect matrix and/or redefine the contribution of each rotor to the change of the one or more sensed states of the multirotor aircraft. Redefining the control effect matrix can include performing a matrix inverse or pseudo-inverse calculation on the control effect matrix after removing the failed rotor from the control effect matrix.

In accordance with at least one aspect of this disclosure, a non-transitory computer readable medium can include instructions for controlling each rotor on a multirotor aircraft, the instructions including any suitable portion or the entirety of any method as described herein.

In accordance with at least one aspect of this disclosure, a multirotor aircraft controller can be configured to output commands to a plurality of rotors of a multirotor aircraft and include a memory, a processor operatively connected to the memory and configured to execute instructions stored on the memory, the instructions including any suitable portion or the entirety of method as described herein.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
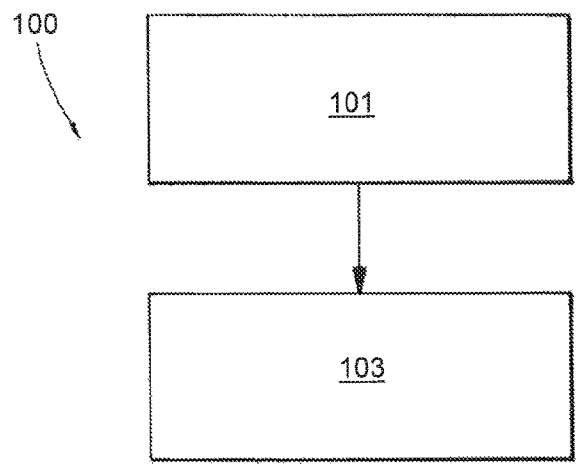
FIG. 1 is a flow chart of an embodiment of a method in accordance with this disclosure.
Figure 2:
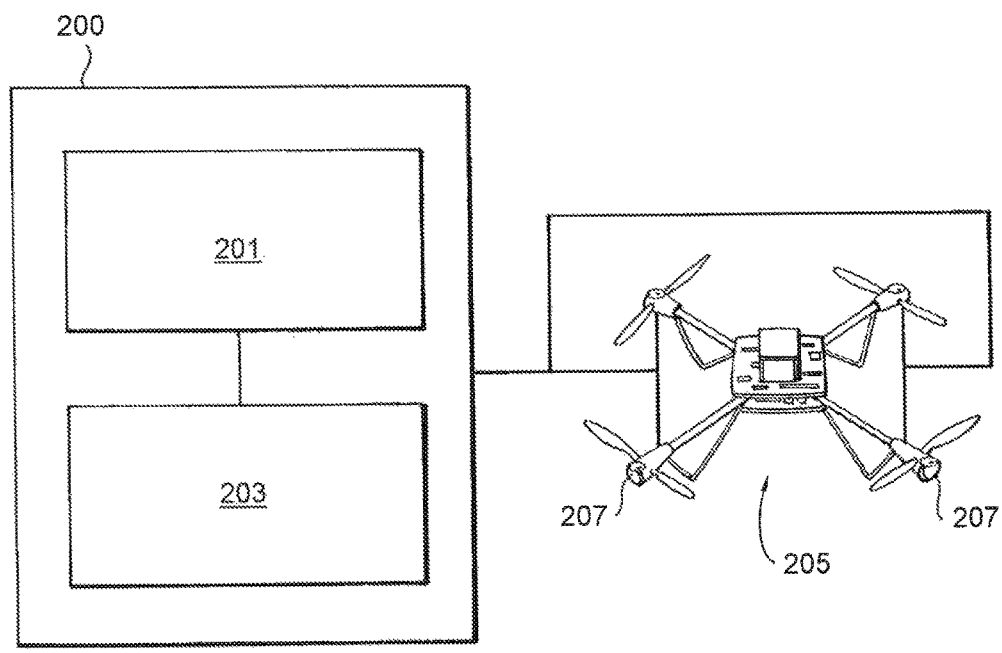
FIG. 2 is a schematic diagram of an embodiment of a controller in accordance with this disclosure; shown connected to each rotor of a multirotor aircraft.

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIG. 1 and is designated generally by reference character 100. Other embodiments and/or aspects of this disclosure are shown in FIG. 2. The systems and methods described herein can be used to dynamically determine and utilize a control scheme for an arbitrary number and configuration of rotors on a multirotor aircraft (e.g., for reconfiguring control inputs to account for rotor failure).

Referring to FIGS. 1 and 2, a method 100 for controlling each rotor 207 on a multirotor aircraft 205 includes receiving (e.g., at block 101) one or more sensed states of the multirotor aircraft 205. The method 100 further includes determining (e.g., at block 103) a control scheme dynamically using the sensed one or more states of the multirotor aircraft 205. The control scheme can be dynamically defined for any aircraft (e.g., multirotor craft 205 shown having four rotors 207) that has an arbitrary (N number) of rotors in an arbitrary location/placement on the aircraft 205.

Receiving (e.g., at block 101) of the one or more sensed states can include receiving one or more of a rotational rate (e.g., rate of roll, pitch, and/or yaw) or acceleration of the aircraft. Sensing any other suitable aircraft state is contemplated herein (e.g., velocity, altitude, roll angle, pitch angle, yaw angle, RPM of each rotor).

Determining the control scheme (e.g., at block 103) can include defining a control effect matrix that specifies the contribution of each rotor to a change of the one or more sensed states of the multirotor aircraft 205. In certain embodiments, determining (e.g., at block 103) the control scheme can include using matrix inversion on the control effect matrix (e.g., if the multirotor aircraft includes up to four rotors). Determining (e.g., at block 103) the control scheme can include using matrix pseudo-inversion on the control effect matrix (e.g., if the multirotor aircraft includes more than four rotors).

In certain embodiments, determining (e.g., at block 103) the control scheme can include detecting a rotor condition by comparing one or more expected states to the one or more sensed states to determine if the one or more sensed states are within a threshold value of the one or more expected states. For example, detecting the rotor condition can include detecting a failed rotor 207.

Determining (e.g., at block 103) the control scheme can include redefining the control effect matrix to remove the failed rotor 207 from the control effect matrix. This can effectively redefine the control effect matrix to an aircraft having N−1 rotors which causes proper redistribute the required thrust outputs of each rotor 207 to coordinate flight (for climbing, straight and level, descent, coordinated crash landing). Any other suitable redefinition of the contributions of each rotor 207 to the change of the one or more sensed states of the multirotor aircraft 205 is contemplated herein.

Redefining the control effect matrix can include performing a matrix inverse (e.g., for aircraft with four rotors) or pseudo-inverse (e.g., for aircraft having more than four rotors) calculation on the control effect matrix after removing the failed rotor 207 from the control effect matrix.

An example embodiment of method 100 is described below. For example, the dynamics of a multirotor aircraft can be described by equation 1:

$$\dot{x}=Ax+Bu, \quad (1)$$

where x is a vector of vehicle states, A is a matrix that defines the open loop response, B is a vector that defines the actuator effectiveness, and u is a vector of actuator inputs. The control input u can be calculated to achieve a desired aircraft state. Control input u can be defined as the ratio of desired thrust to maximum thrust, for example. This is referred to as thrust fraction (TF). For inner-loop control, x can be defined by equation 2:

$$x=[pqrAz], \quad (2)$$

where p, q, and r are the body axis roll, pitch, and yaw rates respectively and Az is the body axis vertical acceleration. Assuming that the aircraft has no open-loop damping, equation 1 can be simplified to equation 3:

$$\dot{x}=Bu. \quad (3)$$

Matrix B can then be solved for using information about the aircraft and propulsive actuators (e.g., rotor location) using equation 4 as follows:

$$B_{i,j}=\delta \dot{x}_i/\delta u_j. \quad (4)$$

If the rotors are assumed to be aligned with the vertical axis of the aircraft, then B can be expressed by equations 5-8:

$$B_{1,i} = \frac{T_{max} * R_{y_i}}{I_{xx}} \quad (5)$$

$$B_{2,i} = \frac{T_{max} * R_{x_i}}{I_{yy}} \quad (6)$$

$$B_{3,i} = \frac{M_{max} * S_i}{I_{zz}} \quad (7)$$

$$B_{4,i} = \frac{T_{max}}{m}, \quad (8)$$

where i is the rotor index (such that i=1 ... N), $T_{max}$ is the maximum thrust of the i-th rotor, $M_{max}$ is the maximum moment of the i-th rotor, $I_{xx}$, $I_{yy}$, and $I_{zz}$ are the vehicle mass moment of inertia about the x, y, and z axis respectively, and $S_i$ is the spin direction of the i-th rotor. S can be set to 1 for clockwise rotors and −1 for counter-clockwise rotors, as viewed from above.

The maximum thrust, $T_{max}$, and maximum moment, $M_{max}$, can be calculated from equations 9 and 10:

$$T_{max} = \rho\left(\frac{RPM_{max}}{60}\right)^2 D^4 Ct_{max} \quad (9)$$

$$M_{max} = \frac{T_{max}*D*Cp_{max}}{2\pi Ct_{max}}, \quad (10)$$

where ρ is the air density, $RPM_{max}$ is the maximum RPM of the rotor, D is the rotor diameter, $Ct_{max}$ and $Cp_{max}$ are the maximum propeller thrust and moment coefficient at maximum throttle.

Individual throttle input values can be calculated from desired vehicle state derivative $\dot{x}$ using equation 11:

$$u=B^{-1}\dot{x} \quad (11)$$

If B is $R^{4\times 4}$ and nonsingular then the inverse, $B^{-1}$, can be computed directly. If the vehicle has more than four rotors and B has a rank of four, for example, then $B^{-1}$ can be calculated using a suitable pseudo-inverse technique known in the art (e.g., Moor-Penrose method).

To detect a failed rotor, a set of body axis angular acceleration values, $\dot{\omega}_{f,j}$, that represent the expected motion of the vehicle with the j-th motor failed can be created as shown in equation 12:

$$\dot{\omega}_{f,j}=[\dot{p}\dot{q}\dot{r}]_{f,j}=B_{1,3}u_{\forall i\neq j}. \quad (12)$$

The set of j acceleration values can be each compared with the actual sensed angular acceleration of the vehicle, $\dot{\omega}$, minus the trim or integral terms from the controller, $\dot{\omega}_{int}$, to form an angular difference, $\Delta\dot{\omega}j$, using equation 13:

$$\Delta\dot{\omega}_j=\dot{\omega}-\dot{\omega}_{f,j}-\dot{\omega}_{int}. \quad (13)$$

The magnitude of $\Delta\dot{\omega}_j$ can then be compared against a predetermined magnitude threshold, $k_{threshold}$, for each rotor, j. In certain embodiments, a failure counter, $c_j$, can be incremented for the j-th rotor based on equation 14:

$$\begin{cases} \text{if } (\|\Delta\dot{\omega}_j\| > k_{threshold}), \text{ then } & c_j = c_j + 1 \\ \text{else if } c_j > 0, \text{ then } & c_j = c_j - 1 \end{cases}. \quad (14)$$

The j-th rotor can be considered failed if $c_j$ exceeds a predetermined count threshold. In certain embodiments, the magnitude threshold and count threshold can be selected to determine failure quickly enough for the aircraft to recover while also precluding false positives. Any other suitable relationship between the magnitude threshold and the count threshold is contemplated herein.

In certain embodiments, the count threshold can be variable for different flight regimes (e.g., climb, cruise, descent) or states (e.g., position, orientation, thrust value). For example, the count threshold can increase with more altitude since there is more time to recover, and/or the count threshold can be set to zero or otherwise eliminated for sufficiently low altitudes).

A failed or less than fully functional rotor can be accommodated by re-calculating B using equations 5-8, above, with the j-th column removed, set to zero, or otherwise suitable redefined. $B^{-1}$ can then be recalculated and used for primary flight control, thereby allowing for dynamic, real-time control scheme adjustment for all rotor conditions. The integral terms, $\dot{\omega}_{int}$, can also be reset to prevent the effects of the failure on the integral terms from causing a transient on the aircraft with the adjusted control allocation.

In accordance with at least one aspect of this disclosure, a non-transitory computer readable medium can include instructions for controlling each rotor 207 on a multirotor aircraft 205, the instructions including any suitable portion or the entirety of any method as described above.

Referring to FIG. 2, a multirotor aircraft controller 200 can be configured to output commands to a plurality of rotors 207 of a multirotor aircraft 205 and can include a memory 201 and a processor 203 operatively connected to the memory 201. The processor 203 can be configured to execute instructions stored on the memory, the instructions including any suitable portion or the entirety of method as described above.

Embodiments as described above can be utilized with any suitable aircraft (e.g., propeller driven multi-rotor that use individual motor throttle commands as the sole actuators for control which have use in disaster response, search and rescue, surveillance, and package delivery for example). The above described control systems and methods are agnostic to rotor placement, count, and spin direction. By dynamically determining the effect of each rotor using sensed states of the aircraft, installation of a controller or software onto any aircraft can be done without the need to preprogram rotor locations/count into the control software. Further, in the event of rotor failure, the above described methods and systems allow for reconfiguration in real-time to maintain coordinated flight.

The methods and systems of the present disclosure, as described above and shown in the drawings, provide for control methods and systems with superior properties including dynamic reconfiguration. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method for controlling each rotor on a multirotor aircraft, comprising:
   receiving one or more sensed states of the multirotor aircraft; and
   determining a rotor control scheme dynamically using the sensed one or more states of the multirotor aircraft, wherein determining the control scheme is done agnostic of rotor placement.

2. The method of claim 1, wherein determining the control scheme includes defining a control effect matrix that specifies the contribution of each rotor to a change of the one or more sensed states of the multirotor aircraft.

3. The method of claim 2, wherein determining the control scheme includes using matrix inversion on the control effect matrix if the multirotor aircraft includes up to four rotors.

4. The method of claim 2, wherein determining the control scheme includes using matrix pseudo-inversion on the control effect matrix if the multirotor aircraft includes more than four rotors.

5. The method of claim 2, wherein determining the control scheme includes detecting a rotor condition by comparing one or more expected states to the one or more sensed states to determine if the one or more sensed states are within a threshold value of the one or more expected states.

6. The method of claim 5, wherein detecting the rotor condition includes detecting a failed rotor.

7. The method of claim 6, wherein determining the control scheme includes redefining the control effect matrix to remove the failed rotor from the control effect matrix and/or redefine the contribution of each rotor to the change of the one or more sensed states of the multirotor aircraft.

8. The method of claim 7, wherein redefining the control effect matrix includes performing a matrix inverse or pseudo-inverse calculation on the control effect matrix after removing the failed rotor from the control effect matrix.

9. The method of claim 1, wherein receiving the one or more sensed states includes receiving one or more of a rotational rate or acceleration of the aircraft.

10. A non-transitory computer readable medium, comprising instructions for controlling each rotor on a multirotor aircraft, the instructions including:
    receiving one or more sensed states of the multirotor aircraft; and
    determining a rotor control scheme dynamically using the one or more sensed states of the multirotor aircraft, wherein determining the control scheme is done agnostic of rotor placement.

11. The non-transitory computer readable medium of claim 10, wherein determining the control scheme includes defining a control effect matrix that specifies the contribution of each rotor to a change of the one or more sensed states of the multirotor aircraft.

12. The non-transitory computer readable medium of claim 11, wherein determining the control scheme includes using matrix inversion on the control effect matrix if the multirotor aircraft includes up to four rotors.

13. The non-transitory computer readable medium of claim 11, wherein determining the control scheme includes using matrix pseudo-inversion on the control effect matrix if the multirotor aircraft includes more than four rotors.

14. The non-transitory computer readable medium of claim 11, wherein determining the control scheme includes detecting a rotor condition by comparing one or more expected states to the one or more sensed states to determine if the one or more sensed states are within a threshold value of the one or more expected states.

15. The non-transitory computer readable medium of claim 14, wherein detecting the rotor condition includes detecting a failed rotor.

16. The non-transitory computer readable medium of claim 15, wherein determining the control scheme includes redefining the control effect matrix to remove the failed rotor from the control effect matrix and/or redefine the contribution of each rotor to the change of the one or more sensed states of the multirotor aircraft.

17. The non-transitory computer readable medium of claim 16, wherein redefining the control effect matrix includes performing a matrix inverse or pseudo-inverse calculation on the control effect matrix after removing the failed rotor from the control effect matrix.

18. The non-transitory computer readable medium of claim 10, wherein receiving the one or more sensed states includes receiving one or more of a rotational rate or acceleration of the aircraft.

19. A multirotor aircraft controller configured to output commands to a plurality of rotors of a multirotor aircraft, comprising:
    a memory; and
    a processor operatively connected to the memory and configured to execute instructions stored on the memory, the instructions including:
       receiving one or more sensed states of the multirotor aircraft; and
       determining a rotor control scheme dynamically using the one or more sensed states of the multirotor aircraft, wherein determining the control scheme is done agnostic of rotor placement.

* * * * *